(12) United States Patent
Suh

(10) Patent No.: US 7,917,673 B2
(45) Date of Patent: Mar. 29, 2011

(54) COMMUNICATION DEVICE AND METHOD HAVING A SHARED LOCAL MEMORY

(75) Inventor: Woon-Sik Suh, Yongin-Si (KR)

(73) Assignee: Samsung Electronics Co., Ltd., Suwon-Si, Gyeonggi-Do (KR)

( * ) Notice: Subject to any disclaimer, the term of this patent is extended or adjusted under 35 U.S.C. 154(b) by 798 days.

(21) Appl. No.: 10/880,110

(22) Filed: Jun. 29, 2004

(65) Prior Publication Data

US 2005/0066067 A1 Mar. 24, 2005

(30) Foreign Application Priority Data

Sep. 20, 2003 (KR) ............................. 2003-0065412
Apr. 12, 2004 (KR) ............................. 2004-0024885

(51) Int. Cl.
*G06F 13/12* (2006.01)

(52) U.S. Cl. ........... 710/62; 375/238; 327/149; 327/158

(58) Field of Classification Search .................... 710/62, 710/1, 58; 375/238; 327/149, 158
See application file for complete search history.

(56) References Cited

U.S. PATENT DOCUMENTS

| | | | | |
|---|---|---|---|---|
| 5,781,480 | A * | 7/1998 | Nogle et al. ............. | 365/189.04 |
| 5,930,502 | A * | 7/1999 | Picco et al. .................... | 713/501 |
| 6,081,477 | A * | 6/2000 | Li ................................ | 365/233 |
| 6,185,704 | B1 * | 2/2001 | Pawate et al. ................. | 714/719 |
| 6,256,723 | B1 | 7/2001 | Hudson et al. .................. | 712/35 |
| 6,295,245 | B1 * | 9/2001 | Tomita et al. ............ | 365/230.08 |
| 6,353,863 | B1 | 3/2002 | Nakagawa et al. | |
| 6,373,783 | B1 * | 4/2002 | Tomita ....................... | 365/233.1 |
| 6,438,066 | B1 * | 8/2002 | Ooishi et al. ............. | 365/233.13 |
| 6,480,429 | B2 * | 11/2002 | Jones et al. ..................... | 365/200 |
| 6,507,592 | B1 * | 1/2003 | Hurvig et al. ................. | 370/503 |
| 6,525,981 | B2 * | 2/2003 | Ryan ............................. | 365/223 |
| 6,567,881 | B1 | 5/2003 | Mojaver et al. | |
| 6,584,588 | B1 * | 6/2003 | Pawate et al. ................. | 714/719 |
| 6,854,588 | B1 | 2/2005 | Blattner et al. | |
| 6,889,336 | B2 * | 5/2005 | Schoenfeld et al. .......... | 713/503 |
| 2002/0040443 | A1 * | 4/2002 | Maeda et al. ................. | 713/320 |
| 2002/0091958 | A1 | 7/2002 | Schoenfeld et al. | |
| 2002/0149967 | A1 * | 10/2002 | Borkenhagen et al. .. | 365/189.05 |
| 2003/0086310 | A1 * | 5/2003 | Jones et al. .................... | 365/200 |
| 2003/0114152 | A1 * | 6/2003 | Gibbs et al. ................... | 455/419 |
| 2004/0022107 | A1 * | 2/2004 | Zaidi et al. .................... | 365/202 |
| 2004/0024955 | A1 * | 2/2004 | Patel ............................. | 711/100 |
| 2006/0277424 | A1 * | 12/2006 | Ryan ............................. | 713/300 |

FOREIGN PATENT DOCUMENTS

WO WO 97/14093 4/1997
WO WO 2004/003759 A1 1/2004

OTHER PUBLICATIONS

3G UMTS Chipset for LG Handsets, pp. 1-4.*
Foreign Office Action.

* cited by examiner

*Primary Examiner* — Alford W Kindred
*Assistant Examiner* — Ernest Unelus
(74) *Attorney, Agent, or Firm* — F. Chau & Associates, LLC

(57) ABSTRACT

A communication device and method is provided, comprising: a signal modulator/demodulator having a digital signal processor for effecting radio communications; and an application processor (AP) having a central processing unit for controlling a plurality of peripherals, and a memory shared by the modem and the AP. The shared memory is accessed by the AP and the modem via a common bus. The plurality of peripherals include at least one of an image capture module, a display, and a flash memory.

19 Claims, 5 Drawing Sheets

COMMUNICATION DEVICE AND METHOD HAVING A SHARED LOCAL MEMORY

BACKGROUND

1. Technical Field

The present invention relates to a communication device and method; in particular, a communication device and method having a plurality of processors and applications using a shared memory.

2. Discussion of Related Art

Recent advances in semiconductor, wireless, and software technologies make available a multitude of applications operable from mobile communication devices such as cellular phones and PDAs. For example, handheld phones used for wireless communication are also usable as PDAs, cameras, game play devices, etc. These applications were available previously as separate standalone devices. In these multi-application communication devices, there are usually at least two integrated circuit chips, each with one or more processing devices. One of the two chips serves as a modulator/demodulator ("modem"). The modem chip includes a digital signal processor ("DSP") for signal processing purposes to effect wireless communications with base stations or other communication devices. The other chip is an application processor ("AP"), having a central processing unit ("CPU") to operate functions and peripherals such as camera or image capture, display, 2D/3D engine/memory, database, etc. Because each application or peripheral operates with a different platform, the CPU communicates with each of the applications and peripherals through interfaces which are distinct and specific to the respective application. The different interfaces are usually embedded within the AP chip. Each of the AP and modem chips in the communication device has respective local memory devices (RAMs and ROMs) for data and program storage, controlled by its respective processor. Each of the AP and modem chips also runs its respective operating system or platform. Communications between the AP and the modem chips are made through a shared interface memory and respective interfaces.

FIG. 1 shows a simplified block diagram of a conventional communication device having the above described configuration, with a modem chip and an application processor chip for operating application or peripheral devices such as a camera, an LCD display, local memory RAM and ROM. A dual-port SRAM serves as the shared interface memory for facilitating communication between the AP and modem chips. Each chip has its respective memory controllers for controlling the local RAM and ROM and the shared interface memory.

FIG. 2 shows a more detailed block diagram of the conventional communication device of FIG. 1. As shown, the AP chip 110 includes a CPU 111 for controlling peripheral devices such as LCD module 120, camera module 130, and memory module 140. Because each application/peripheral has its own operating system, there must be separate interfaces or control units for respective applications, such as LCDC 113 for controlling the LCD module 120, CAM controller 115 for controlling the camera module 130, and memory controller 117 for controlling memory module 140. Further, each application connects to the AP chip 110 through different buses at different pinouts of the chip. As an example, the LCD module 120 requires a 30-pin bus connection to the LCDC 113, the camera module 130 requires a 20-pin bus connection to camera control unit 115, and the memory module 140 requires a 50-pin bus connection to memory controller 117.

The modem chip 150 includes a DSP 155 and coprocessor 151 for effecting radio communication functions. The DSP 155 communicates with coprocessor 151 through internal interface 153. The modem chip 150 connects to an external memory module 160 via a memory controller 157. Communication between the AP chip 110 and modem chip 150 is by interface line 170, via a shared memory (not shown). Individual memory controllers 119 and 159 are disposed within respective AP chips 110 and modem chip 150 to independently access through respective ports of the dual port shared interface memory.

In mobile devices such as a cellular phone with multiple applications such as that shown in FIGS. 1 and 2, the physical size of the AP chip 110 is comparatively large because of the requirement for the large number of pinouts and the different busses and interfaces. Also, operation of multiple applications with different platforms requires constant processing by the CPU 111, therefore, power consumption would be relatively high. Even if the AP and modem chips were operating under a common platform, such as disclosed in the commonly assigned U.S. patent application Ser. No. 10/813,327, filed on Mar. 30, 2004, the disclosure of which is incorporated-by-reference in its entirety herein, the separate local RAM and ROM devices in respective AP and modem chips still represent duplication of resources.

A need therefore exists for a mobile communication device and method having multiple applications which minimizes physical size and power consumption.

SUMMARY OF THE INVENTION

A communication device according to an embodiment of the present invention comprises: a signal modulator/demodulator (modem) having a digital signal processor for effecting radio communications; an application processor (AP) having a central processing unit for controlling a plurality of peripherals; and a shared memory for storing data used by the modem and the AP, the data is accessible by the modem and the AP, wherein the shared memory is accessed by the modem and the AP via a common bus. Preferably, the shared memory is an SDRAM, a DDR SDRAM, and/or a flash memory. The flash memory is an NAND type flash.

The AP, the modem, and the shared memory are preferably clocked by a common clock, wherein data access to and from the shared memory use both the rising and falling edges of the clock, or wherein data access of the shared memory to and from the AP are made using the rising edges and data access of the shared memory to and from the modem are made using the falling edges of the clock.

According to a preferred embodiment, data access of the shared memory to and from the AP are made using the falling edges and data access of the shared memory to and from the modem are made using the rising edges of the clock, wherein communications from the AP to the modem are made using one of the rising or falling edges and communications from the modem to the AP are made using the other of the rising and falling edges of the clock. The shared memory can also be used by the AP and the modem for storing interface control data. Preferably, the plurality of peripherals include at least at least one of an image capture module and a display.

According to another embodiment of the invention, a method is provided for accessing a shared memory in a communication device having a signal modulator/demodulator (modem) for effecting radio communications and an application processor (AP) having a central processing unit, comprising: clocking the AP, the modem, and the shared memory by a common clock; accessing CPU data to and from the shared memory by the AP using one of the rising edges and falling edges of the clock and accessing modem data to and from the shared memory by the modem using the other edges of the clock not used by the AP, wherein the shared memory is accessed by the modem and the AP via a common bus. Preferably, the shared memory is an SDRAM, a DDR SDRAM, and/or a flash memory. The flash memory is an NAND type flash.

According to a preferred embodiment, data access of the memory to and from the AP are made using the rising edges and data access of the shared memory to and from the modem are made using the falling edges of the clock.

The method further including storing address data in an AP address register from the AP using one of the rising edges and falling edges of the clock and storing address data in a modem address register from the modem using the other edges of the clock not used at the AP address register, and the shared memory can also be used by the AP and the modem for storing interface control data.

According to another aspect of the invention, a communication device is provided, comprising: an application processor having a CPU; a modem for effecting radio communications, wherein the AP and the modem receive a common clock; and an interface for interfacing the AP with the modem, wherein signals originating from the AP are clocked by first transitioning edges of the common clock and signals originating from the modem are clocked by second transitioning edges of the common clock, the first transitioning edges and the second transitioning edges being opposite transitions.

The communication device further includes a memory shared by the AP and the modem, wherein the memory is interfaced by the interface and the interface is clocked by the common clock. Preferably, data from the AP is written in the memory by clocking with first transitioning edges and data from the modem is written in the memory by clocking with second transitioning edges. the memory further includes first and second address registers, the first address register for clocking addresses using the first transitioning edges and the second address register for clocking addresses using the second transitioning edges of the common clock, wherein data access to/from the memory includes data from the AP and the modem within a single clock cycle of the common clock.

A method is also provided for accessing a shared memory in a communication device having a signal modulator/demodulator (modem) for effecting radio communications and an application processor (AP) having a central processing unit, comprising: clocking the AP, the modem, and the shared memory by a clock; accessing the shared memory by the AP and the modem using both the rising edges and falling edges of the clock.

DETAILED DESCRIPTION OF PREFERRED EMBODIMENTS

According to embodiments of the present invention, multiple applications of a mobile communication device are run from the AP chip through several busses or a common buss. The common buss protocol is preferred and such architecture and protocol is disclosed in the commonly assigned U.S. patent application Ser. No. 10/813,327, filed on Mar. 30, 2004, the disclosure of which is incorporated-by-reference in its entirety herein. Control of the multiple applications connected to the common bus can be by a common platform with packetized commands issued by a common master bus controller through the common bus. The common master bus controller replaces the individual interfaces/controllers and their dedicated busses.

According to a preferred embodiment of the present invention, the AP chip and modem chip share a local memory device, further reducing the number of pinouts in its chip packaging. More preferably, the AP, modem, and the shared local memory device are integrated into a single chip or chipset.

Figure 1:
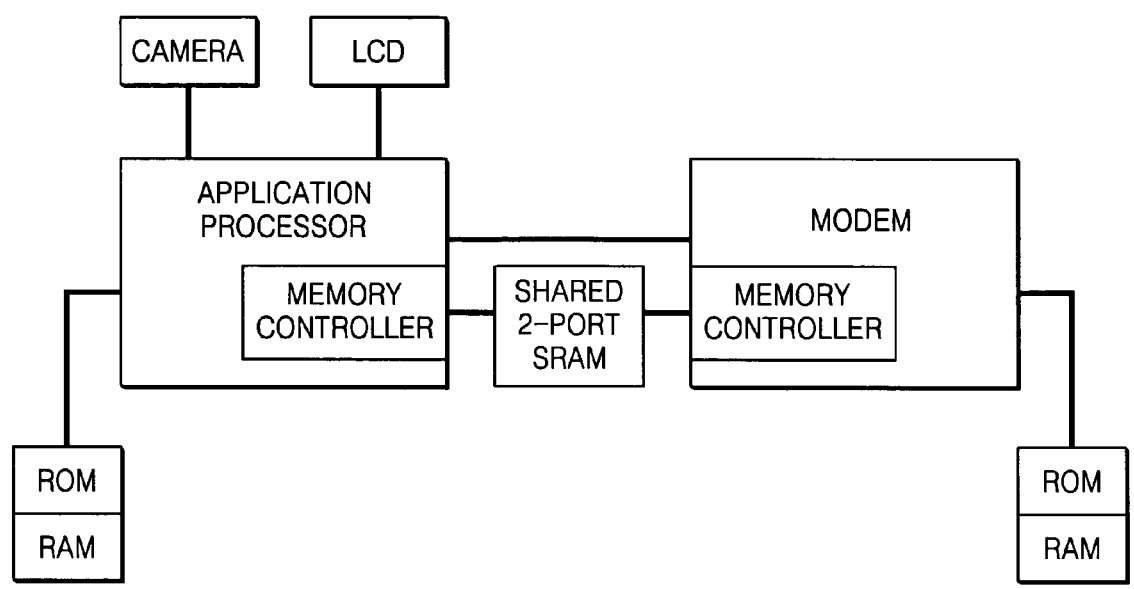
FIG. 1 shows a simplified block diagram of a conventional communication device.
Figure 2:
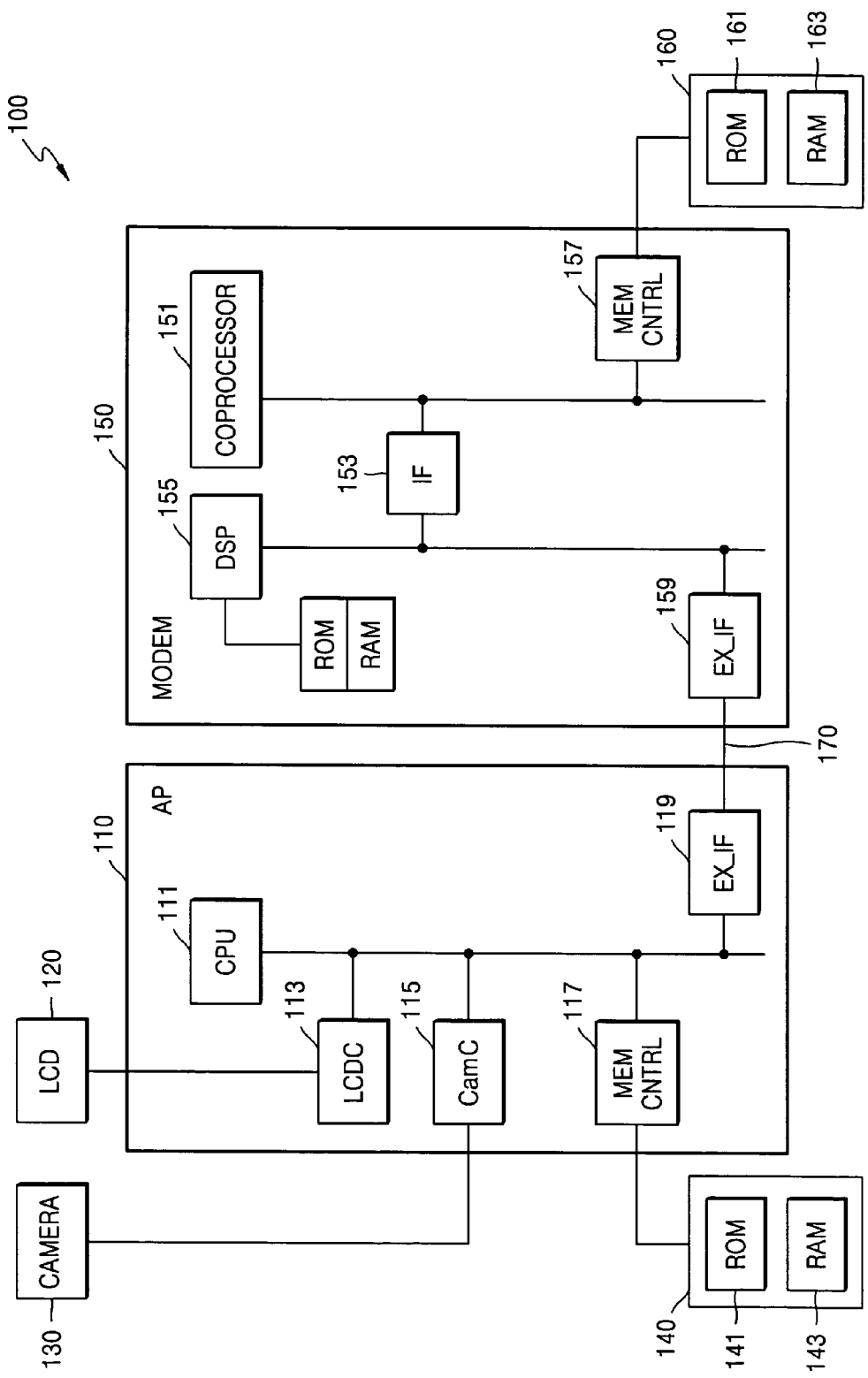
FIG. 2 shows a block diagram of the conventional communication device of FIG. 1.
Figure 3:
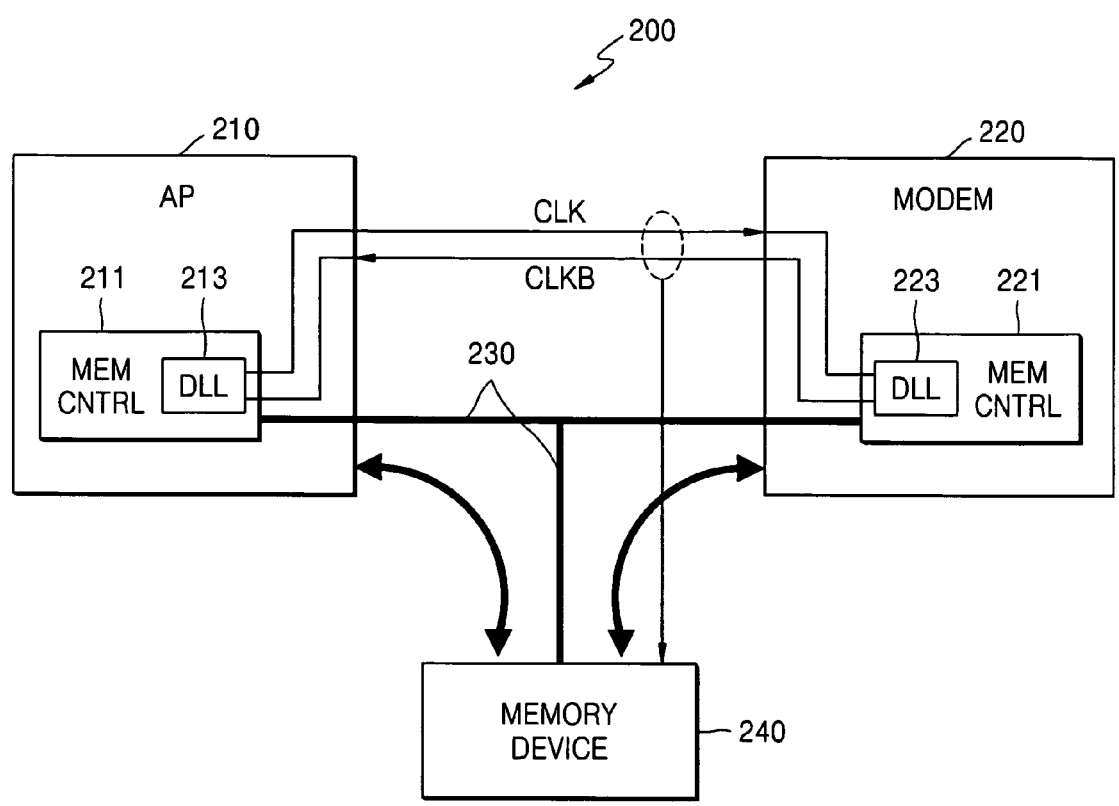
FIG. 3 shows a block diagram of a communication device according to a preferred embodiment of the present invention.

FIG. 3 shows a block diagram of a communication device according to a preferred embodiment of the present invention. The illustrative communication device includes an application processor 210, a modem 220, and a shared local memory device 240. The modem 220 includes a DSP and modulator/demodulator circuit (not shown) for processing signals to effect wireless or radio communications with other compatible communication devices or base station. The AP 210 includes a CPU which controls CPU associated internal functions such as bridge and application peripherals such as camera, display, USB device, etc. (not shown). Both the AP and the modem include respective memory controllers 211 and 221, each with respective clock synchronization circuit 213 and 223. Preferably, the clock synchronization circuit is a delay lock loop (DDL). According to this embodiment, the DDLs are synchronized to a common clock CLK and CLKB. CLKB is the same clock as CLK but inverted in phase.

Figure 4:
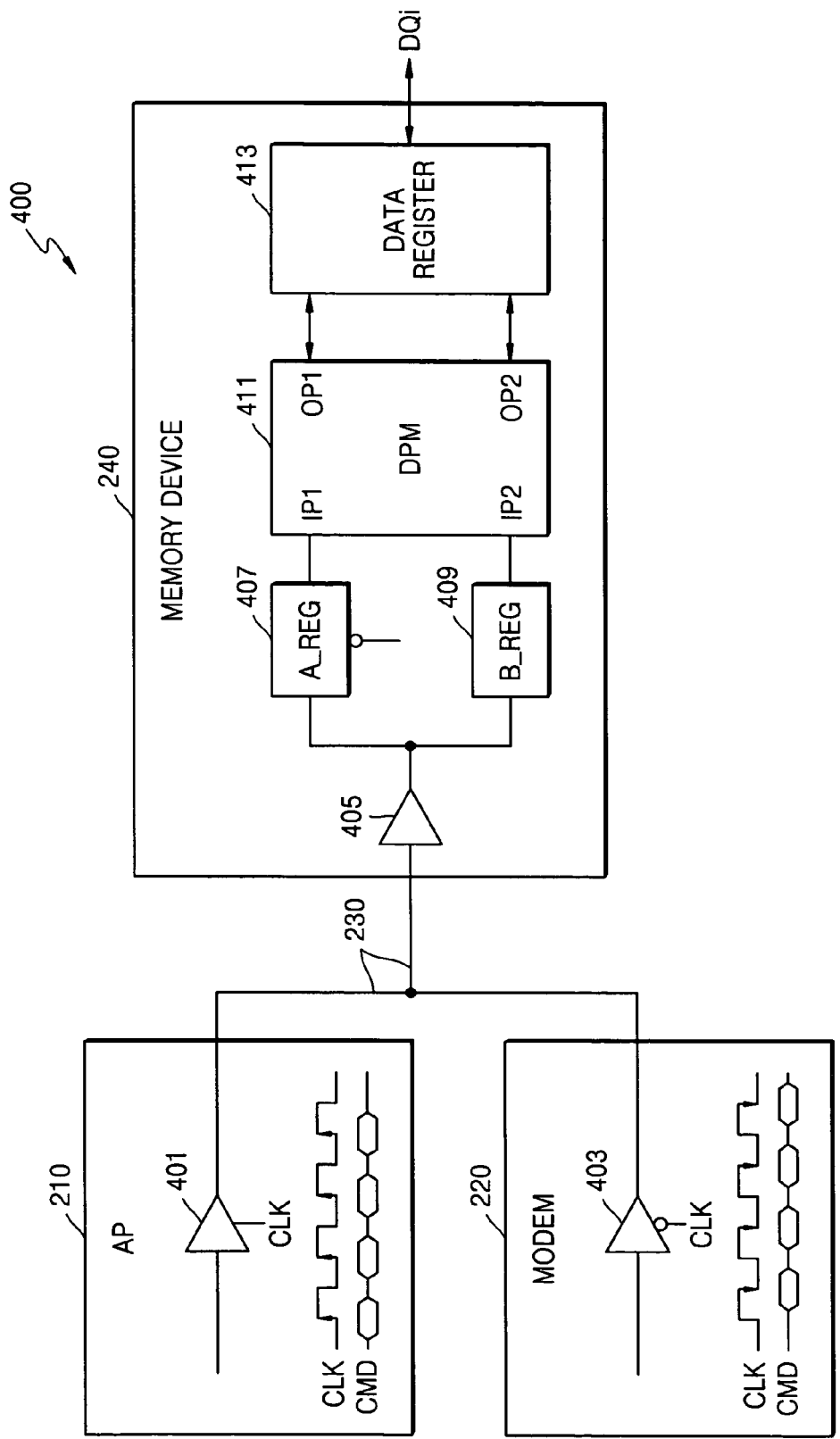
FIG. 4 shows a block diagram of a shared local memory connected to communication and processing devices.

FIG. 4 shows a block diagram of a shared memory device connected to the AP and the modem according to an embodiment of the present invention. The shared local memory device 240 includes a memory 411, preferably an SDRAM and more preferably a double data rate (DDR) SDRAM, with dual address and dual output ports. A memory device supports memory data access using both the rising and falling edges of the clock signal CLK. According to the present embodiment of the invention, data associated with the AP 210 is written to or read from the local memory device 240 using one clock edge and the data associated with the modem 220 is written to or read from the local memory device 240 using the other clock edge. For purposes of illustrating the present embodiment, the one clock edge used by the AP is the rising clock edge and the other clock edge used by the modem is the falling clock edge. It is appreciated that the particular clock edge used by either AP or the modem for accessing data to/from memory 411 can be interchangeable.

Address registers 407 and 409 are connected to address output ports of the AP 210 and the modem 220 through buffer 405, which in turn is connected to address buffer 401 of the AP 210 and address buffer 403 of the modem 220. The address buffer 401 of the AP 210 as well as register 409 are activated by the rising edges of clock CLK and address buffer 403 and address register 407 are activated by the falling edges of clock CLK. The address data output from the address registers 407 and 409 are input to the dual address ports of memory 411. Thus, address data from the AP 210 can be received at the memory 411 on the first rising edge of CLK and a separate address from the modem 220 can be received at the memory 411 on the falling edge of the clock cycle immediately following the first rising edge. Data accessed to/from the memory 411 is through data register 413, which communicates bidirectionally with memory 411. To write data into memory 411, data is latched in data register 413 and then writer into memory 411 at the address corresponding to the address from the address registers. Data read from memory 411 is latched in data register 413 and then output to the AP 210 or modem 220.

Figure 5:
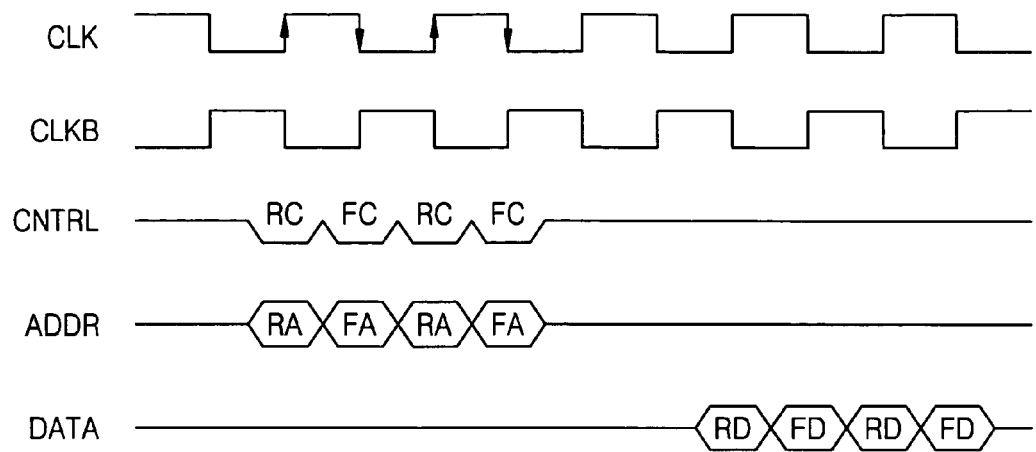
FIG. 5 shows a timing diagram of data access to/from a shared local memory according to a preferred embodiment of the present invention.

FIG. 5 is a timing diagram illustrating the clocking waveforms for a data access operation. As can be seen, addresses RA and RB, preferably from the AP 210, are clocked on the rising edges of clock CLK and addresses FA and FB, preferably from the modem 220, are clocked on the falling edges of clock CLK. Likewise, commands CR, such as used for a read or a write command, are clocked on the rising edges and commands CF are clocked on the falling edges of clock CLK. Data RD and FD are accessed from/to the MEMORY 411 on the rising and falling edges of CLK, respectively as shown.

Figure 6:
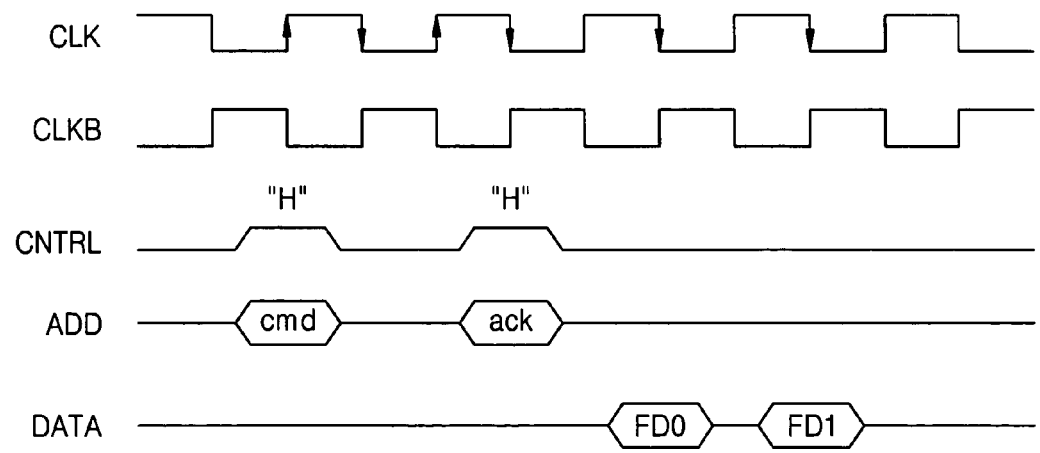
FIG. 6 shows a timing diagram of communication between a communication device and a processing device according to another preferred embodiment of the present invention.

FIG. 6 is a timing diagram illustrating use of both edges of clock CLK for communication between the AP 210 and the modem 220. According to this embodiment, the AP 210 sends signals to the modem 220 using the rising edges of clock CLK and the modem 220 sends signals to the AP 210 using the falling edges of clock CLK. As shown, a command or request is sent from the AP 210 to the modem on the rising edge of clock CLK. The modem 220 acknowledges the request on the falling edge of the next clock cycle and then data FD0 and FD1 are output from the modem 220 to the AP 210 on the falling edges of succeeding clock cycles. It is appreciated that while the embodiment is described with the use of rising edges for communication from the AP to the modem and falling edges for communication from the modem to the AP, the rising and falling edges can be interchangeable without affecting communication between the AP and modem devices.

According to another embodiment of the present invention, the shared local memory is used as described above for storage of data associated with both the AP and the modem, and further used as a shared interface memory between the AP and the modem. In such configuration, interface control data, as well as AP associated data such as CPU data are stored in the memory 411. With such configuration, and the use of a common platform for communication with connected applications and devices such as cameras and displays, the communication device including the AP, the modem, and the shared memory can be integrated into a single chip or chipset.

According to still another embodiment of the present invention, the memory 411 includes a flash memory, preferably a NAND type flash memory, for supporting nonvolatile storage of programs and other data, such as image or video files. For example, the shared memory 411 stores data used in connection with the CPU as well as peripheral functions such as storage of images captured by a camera.

Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention.

The invention claimed is:

1. A method of accessing a shared memory in a communication device having a signal modulator/demodulator (modem) for effecting radio communications and an application processor (AP) having a central processing unit, comprising:
    clocking the AP, the modem, and the shared memory by a common clock;
    accessing the shared memory by both the AP and the modem at different edges of a clock cycle by accessing CPU data to and from the shared memory by the AP using a rising edge or a falling edge of a clock cycle and accessing modem data to and from the shared memory by the modem using the other edge of the clock cycle not used by the AP.

2. The method of claim 1, wherein the shared memory is accessed by the modem and the AP via a common bus.

3. The method of claim 1, wherein the shared memory is an SDRAM.

4. The method of claim 3, wherein the shared memory is a DDR SDRAM.

5. The method of claim 1, wherein data access of the memory to and from the AP are made using the rising edge and data access of the shared memory to and from the modem are made using the falling edge of the clock cycle.

6. The method of claim 1, further including storing address data in an AP address register from the AP using one of the rising edge and falling edge of the clock cycle and storing address data in a modem address register from the modem using the other edge of the clock cycle not used at the AP address register.

7. The method of claim 1, wherein the shared memory is used by the AP and the modem for storing interface control data.

8. The method of claim 1, wherein the shared memory includes an SDRAM and a flash memory.

9. The method of claim 8, wherein the flash memory is a NAND type flash memory.

10. The method of claim 1, further including controlling by the AP at least one of an image capture module and a display.

11. The method of claim 1, further including communicating from the AP to the modem using one of the rising or falling edges of the clock cycle and communicating from the modem to the AP using the other edge of the rising and falling edges edge of the clock cycle.

12. A communication device comprising:
    an application processor having a CPU;
    a modem for effecting radio communications, wherein the AP and the modem receive a common clock; and
    an interface for interfacing the AP with the modem, wherein a signal originating from the AP is clocked by a first transitioning edge of a clock cycle of the common clock and a signal originating from the modem is clocked by a second transitioning edge of the clock cycle of the common clock, the first transitioning edge and the second transitioning edge being opposite transitions, to access the shared memory by both the AP and the modem at different edges of the clock cycle.

13. The communication device of claim 12, further including a memory shared by the AP and the modem, wherein the memory is interfaced by the interface and the interface is clocked by the common clock.

14. The communication device of claim 13, wherein data from the AP is written in the memory by clocking with first transitioning edge and data from the modem is written in the memory by clocking with second transitioning edge.

15. The communication device of claim 13, wherein the memory further includes first and second address registers, the first address register for clocking addresses using the first transitioning edge and the second address register for clocking addresses using the second transitioning edge of the clock cycle of the common clock.

16. The communication device of claim 13, wherein the memory is an SDRAM.

17. The communication device of claim 13, wherein the memory is a flash memory.

18. The communication device of claim 13, wherein the memory is a DDR memory.

19. The communication device of claim 13, wherein data access to/from the memory includes data from the AP and the modem within a single clock cycle of the common clock.

* * * * *